Jan. 23, 1940.  S. D. ROBINS  2,188,060
POWER TRANSMISSION FOR OSCILLATORY BODIES
Filed Jan. 24, 1936   5 Sheets-Sheet 1

INVENTOR
Samuel D. Robins
BY
ATTORNEY

Jan. 23, 1940.                S. D. ROBINS                2,188,060
              POWER TRANSMISSION FOR OSCILLATORY BODIES
                    Filed Jan. 24, 1936        5 Sheets-Sheet 2

INVENTOR
Samuel D. Robins
BY
ATTORNEY

Jan. 23, 1940.                S. D. ROBINS                2,188,060
                POWER TRANSMISSION FOR OSCILLATORY BODIES
                Filed Jan. 24, 1936          5 Sheets-Sheet 3

INVENTOR
Samuel D. Robins
BY
H. C. Aiseny
ATTORNEY

Jan. 23, 1940.　　　　S. D. ROBINS　　　　2,188,060
POWER TRANSMISSION FOR OSCILLATORY BODIES
Filed Jan. 24, 1936　　　5 Sheets-Sheet 5

INVENTOR
Samuel D. Robins
BY
H. C. Bieserug
ATTORNEY

Patented Jan. 23, 1940

2,188,060

UNITED STATES PATENT OFFICE 2,188,060

POWER TRANSMISSION FOR OSCILLATORY BODIES

Samuel D. Robins, New York, N. Y., assignor to Robins Conveying Belt Company, New York, N. Y., a corporation of New York Application January 24, 1936, Serial No. 60,577

16 Claims. (Cl. 209—329)

This invention relates to improved means for transmitting power from a prime-mover or a power source, such as a motor, to a relatively heavy vibratory or oscillatory mass. It is particularly applicable to heavy screens of the type employed in the screening of coal or stone, or the like. It is also applicable to conveyors embodying heavy reciprocating parts and to feeders of the type employed to regulate the supply of coal or the like being delivered from a hopper. Numerous other applications of the improved features will occur to those familiar with the problems involved in various fields. However, the peculiar suitability of the improvements to the operation of vibratory screens is such that the invention is illustrated herein as applied to that field.

Briefly, the invention involves the mounting of a screen or other mass on suitable supports in such a way as to be biased into a normal or central position by a force equal, or nearly equal, to the maximum force of acceleration encountered in reciprocating the mass and positively imparting a reciprocating force to the balanced mass through a gradually increasing stroke, beginning with a small or even an infinitesimal movement, until the desired oscillation is reached. The prime-mover is first brought to the desired speed, preferably corresponding approximately with the natural period of the mass, without imparting any appreciable movement to the mass and it is then made effective through the gradually increasing stroke while the frequency is maintained substantially constant. It has been found that a comparatively heavy mass may not only be maintained in vibration with a small expenditure of energy in this way but also a comparatively small motor may be used to bring the mass from a condition of rest up to the desired vibratory condition. Furthermore, due to the positive connection at all times between the power source and the mass, the latter is oscillated through a constant stroke so long as the adjustment of the parts remains the same. No variation in the stroke is produced by even a substantial variation in the weight of the mass, as when the load on a screen is suddenly varied.

Other features and advantages of the invention will appear from the detailed description of the various illustrative forms that will now be given in conjunction with the accompanying drawings in which.

Figure 1:
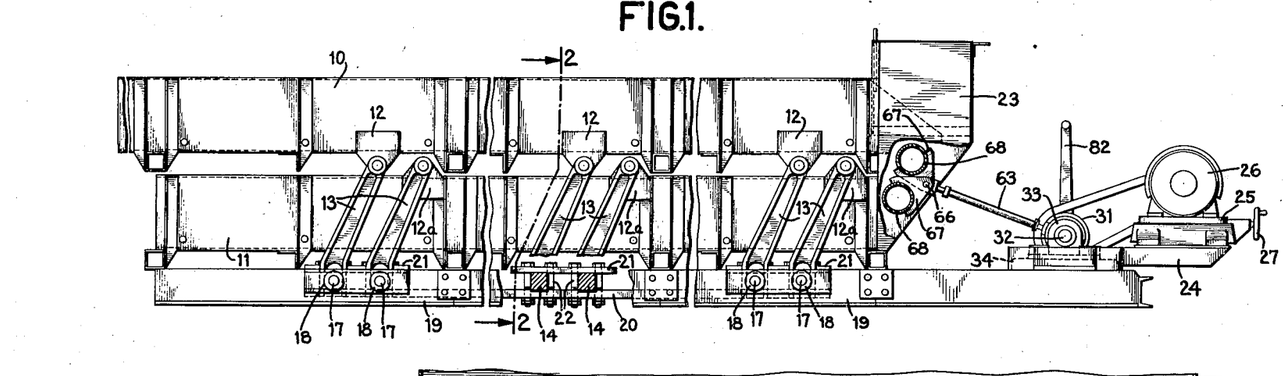
Fig. 1 is a side elevation of a pair of superposed screens mounted and driven in accordance with the invention, the screen being broken out at several points to reduce the length of the figure and parts being broken away to better disclose certain details.
Figure 2:
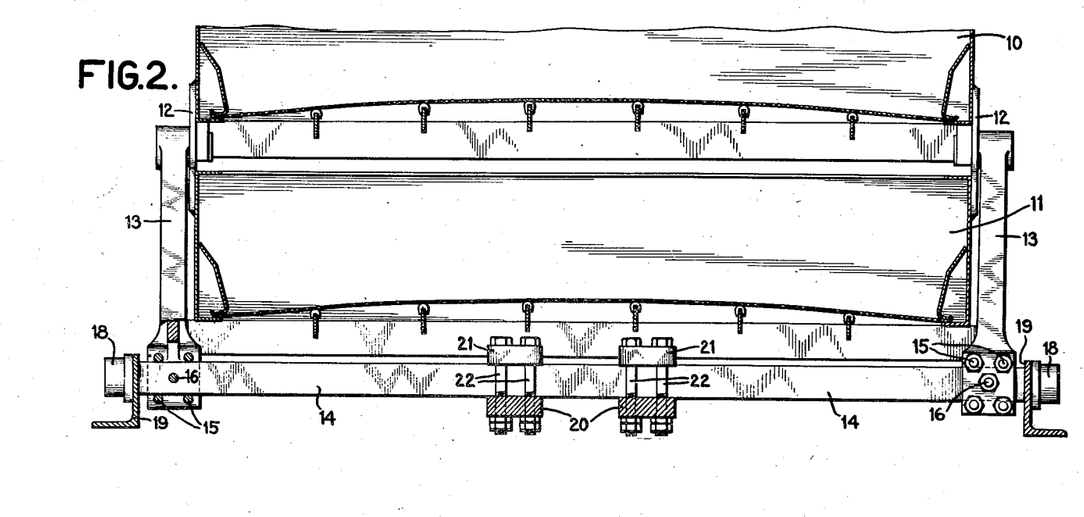
Fig. 2 is a vertical, sectional view along the line 2—2 of Figure 1.
Figure 3:
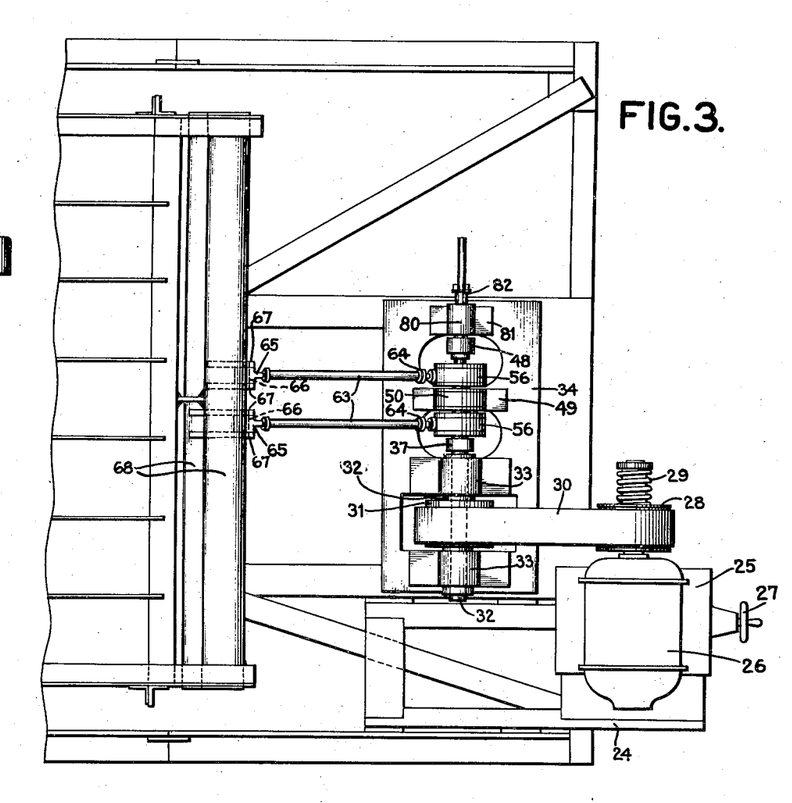
Fig. 3 is a plan view, on an enlarged scale, showing one end of the screens and the connections from a power source to the screens.

Turning now to the drawings, there is shown in Figures 1 and 2 a pair of screens 10 and 11, the screen 10 being superposed above the screen 11. At each side of the screen 10 there is provided a series of plates or brackets 12 to which are pivotally connected a series of arms 13. Similar plates or brackets 12a are attached to the upper edges of the lower screen and provide for the pivotal connection of another series of arms 13, just like the first series, with the lower screen. The lower ends of the arms 13 are bifurcated and each is arranged to straddle one of a group of resilient torsion bars 14 which serve as springs, as will be later more fully explained. A series of bolts 15 extending between the bifurcations of each arm above and below the bar 14 and a bolt 16 passing centrally through the bifurcations and through the bar may be provided to firmly attach the arms to the bars. At their ends the bars 14 are formed with rounded trunnion portions 17 extending into bearings 18 carried by frame members 19 suitably mounted on an appropriate foundation. In the vibration of the screen the arms 13 twist the ends of the bars and cause their trunnions to turn in the bearings. Means are provided, however, for anchoring and preventing turning of the central portions of the bars. This means may comprise a pair of plates or bars 20 extending longitudinally of the screen and arranged one at either side of the center line. These plates are located beneath the bars 14 while similar plates 21 are located above the bars 14. As shown, the plates 20 preferably extend across all of the bars 14 while the plates 21 are formed in sections, each extending merely across adjacent pairs of the bars to avoid interference with portions of the screen. Bolts 22 are provided to tie the plates 20 and 21 together, these bolts preferably passing closely adjacent to the bars 14 and on either side of the same.

As will be more fully explained later, the two screens are arranged to be vibrated in opposition to each other, i. e., when one screen is shifted toward the right the other will be shifted toward the left and vice versa. This eliminates the shock which would otherwise be imparted to the supporting structure since the forces of acceleration and deceleration are balanced. Furthermore, since the adjacent bars 14 of each pair are having their ends twisted in opposite directions at all times, the twisting action at the center of one bar as imparted to the plates 20 and 21 will be opposed by the opposite twisting action of the other bar. Due to the inclination of the arms 13 at a suitable angle, the lines joining the center of the trunnion 17 with the center of the pivot at the top of the arm being normally about 20° from the vertical, the movement of each screen will be upwardly toward the left and downwardly toward the right in Figure 1. Actually the movement will be slightly arcuate but it is substantially along a straight line inclined at an angle of about 20° to the horizontal. The character and size of the bars 14 is preferably such that the restoring forces imparted to the screens as they are vibrated at or near the natural period of vibration will be substantially equal to the accelerating forces required to bring about the reversal of direction at the ends of the movement regardless of the amplitude of such movement. This means that the screens and torsion bars are so related that their natural period of vibration is substantially equal to the speed of oscillation to be imposed upon the equipment by the prime mover. It will be understood that the natural period of the system may vary within moderately wide limits without imposing an undue load upon the power source. For most economical results, however, the natural period of the screen, with an average normal load, is preferably arranged to be about the desired imposed speed of oscillation.

The screens may be of any suitable construction and may be of any desired length. As shown, they may conveniently be formed in sections, three such sections being illustrated as connected together to form each screen. If a greater number of sections are joined or the screen is otherwise made longer, a greater number of supporting arms 13 and torsion bars 14 may be found desirable. This construction enables the assembly of any desired number of units into one screen, each new unit having associated with it a new spring bar which increases the total spring capacity in proportion to the increase in the mass. The coal or stone or the like to be screened may be supplied through a hopper 23 of any convenient form.

Figure 4:
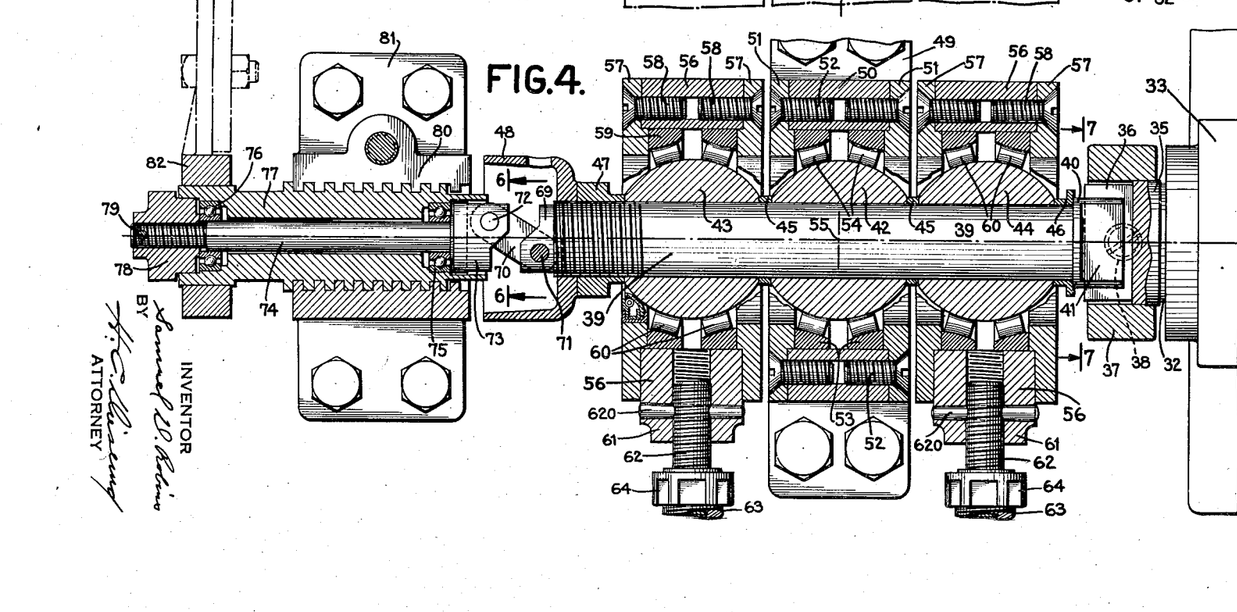
Fig. 4 is an enlarged, axial section through certain of the operating connections for vibrating the screens.

On an extension 24 of the base or frame which carries the screens in the manner explained above, there is provided an adjustable platform 25 carrying a motor 26. The platform 25 may be moved toward and away from the screen structure by simply turning a hand-wheel 27. This is for the purpose of effecting a variable drive through an expanding pulley 28, the two sides of which are urged together by a spring 29. This variable drive may be of any conventional form. A belt 30 is connected between the pulley 28 and a pulley 31 carried by a prime mover shaft 32 mounted in bearings 33 which are in turn carried by a support 34 mounted on the base structure. The end 35 of the shaft 32 extending toward the center of the frame is slightly enlarged, as best shown in Fig. 4, and is provided with a slot 36 at its end extending across a diameter. A collar 37 is fitted over the end of the shaft and is secured thereto by a set-screw 38. This collar serves to close the ends of the slot.

A shaft 39 has an enlarged end portion 40 milled to provide a flat-sided key member 41 arranged to fit into the slot 36 and form a driving connection therewith. The shaft 39 is provided with a central bearing sleeve 42 having a spherical outer face forming a roller raceway. Similar bearing sleeves 43 and 44 are mounted on the shaft at either side of the central bearing sleeve. A pair of spacing collars 45 may be provided, one at either side of the central sleeve to maintain the three sleeves in appropriate, spaced relation. Adjacent the enlargement 40 is a collar 46 surrounding the reduced portion of the shaft 39 and serving to space the bearing sleeve 44 from the enlargement. The series of sleeves and spacing elements may be retained in appropriate position on the shaft by means of a nut 47 cooperating with threads on the shaft and having a portion bearing against the outer end of the sleeve 43. A check-nut 48 also having screw-threaded engagement with the shaft serves to lock the assembly together and also provides a hood over certain connections, to be later described.

The shaft 39 is rockably supported in a bearing carried by a support 49 secured to the main frame. This bearing is formed in a number of sections, including a central band 50 and a pair of side rings 51 held together by a number of screws 52. Within the casing formed by these elements there is mounted a pair of rings 53 providing raceways for roller bearing elements 54. These rollers are formed with concave surfaces adapted to provide arcuate, line contact with the raceway of the sleeve 42 and with the inner surfaces or raceways of the rings 53. It will be apparent that this construction will enable the shaft 39 to be rocked through a considerable angle and to rotate freely when so rocked. In rocking the shaft a point 55, which is at the inter-section of a median, transverse plane through the bearing sleeve 42 with the axis of the shaft 39, will remain fixed but other points on the shaft will, of course shift in accordance with their distance from the point 55.

The sleeves 43 and 44 cooperate with structures very similar to the bearing cooperating with sleeve 42. However, the surrounding members in this instance are not fixed bearings but in effect constitute eccentric straps. These straps comprise a casing formed by a central band 56 and a pair of rings 57 held together as a unit by means of screws 58. Rings 59 within the casing provide raceways for rollers 60 which coact between these raceways and the raceways of the sleeves 43 and 44. The central band 56 is provided with a radial extension 61 at one point, which is screw-threaded to receive a threaded coupling 62. A pin 620 may be provided to lock the coupling within the socket of the strap. To the outer end of the coupling 62 is attached a rod 63, these parts being clamped in suitably adjusted relation by means of a clamp nut 64. The opposite end of rod 63 is connected with a member 65 carried by a pivot pin 66 extending between a pair of arms 67 welded or otherwise secured to a tubular member 68. This member is attached in any convenient way to the end of one of the screens. It will be understood that the construction just described is duplicated, the same arrangement being provided for each of the straps associated with the sleeves 43 and 44. As best shown in Fig. 1, the members 67 secured to the two tubes 68 are so arranged that the pivot pins 66 carried thereby are in axial alinement. This places the two rods 63 in parallel relation.

The end of the shaft 39 within the hood of the check nut 48 is slightly reduced, as shown at 69, and is slotted to receive a link 70 between the bifurcations so formed. Link 70 is attached to the end of the shaft by means of a pivot pin 71. At its opposite end the link is pivotally connected, by means of a pin 72, with an enlarged, bifurcated end 73 of a shaft 74. This shaft is carried by a pair of roller bearings 75 and 76 mounted in the open ends of a sleeve 77. A nut 78 mounted upon a reduced, threaded portion of the shaft 74 and locked in position by a pin 79 serves to retain the shaft 74 and the roller bearings in proper assembled relation within the sleeve 77. On its outer surface this sleeve is provided with a screw-thread or spiral rib adapted to cooperate with a corresponding thread or spiral depression in a supporting member 80 carried by an element 81 secured to the main frame. At the outer end of the sleeve 77 there is mounted a lever 82, the handle or operating portion of which is shown in broken lines, due to the fact that it actually extends in a direction in which it would not be visible in this view.

It will be apparent that when the parts are in the positions indicated in Fig. 4, the shaft 39 will be rotated by means of the prime-mover shaft 32 about the true axis of shaft 39 so that no movement will be imparted to the straps 56. However, should the lever 82 be shifted to turn the sleeve 77 within its support 80 and thereby cause a movement of the sleeve toward the right in Fig. 4, the pivot pin 72 on the shaft 74 will likewise be carried toward the right and the link 70 will be moved into a more nearly vertical position. This can only be accomplished by shifting the pivot pin 71 further away from the axis of the shaft 39. In so shifting the pivot pin 71 the shaft 39 will be tilted into the position indicated in Fig. 5. As previously explained, this tilting of the shaft will take place about the point 55 and will be readily permitted by the spherical bearing structure described. Tilting of the shaft will also shift the key member 41 within the slot 36 in shaft 32. When the parts are in this shifted position, it will be apparent that rotation of shaft 32 will produce rotation of shaft 39 in such a way that an eccentric motion is produced. Accordingly the straps 56 will be moved in the direction of the connecting links 63 an extent depending upon the angle through which the shaft is tilted. In applying the invention to a screen structure of the type illustrated, the maximum eccentricity will ordinarily be such as to produce a motion of about ⅜ of an inch. Assuming that the shaft 39 is operated at, say, 1000 R. P. M., it will be seen that the pair of screens 10 and 11 will then be vibrated at 1000 complete oscillations per minute.

According to the present invention, it is contemplated that a comparatively small motor may be used to operate the screen. The arrangement is such that when the screens are once set into vibration, at the desired speed, say 1000 vibrations per minute, very little energy will be required to maintain them in vibration. This is for the reason that the spring bars 14 are so chosen in relation to the construction of the screen that the natural period of vibration of the system is substantially the same as the imposed speed of oscillation desired, e. g., 1000 vibrations per minute. Accordingly, about the only energy that it is required to impart to the system, once it is set into motion, is that sufficient to compensate for the dissipation of energy through friction and the like. This is assuming, of course, that the imposed oscillations are at the natural period of the system. If these two do not coincide a slight additional amount of energy must be put into the system. Nevertheless it has been found that with an imposed frequency varying as much as 5% above or below the natural period or frequency, a 12 foot screen, weighing when loaded about one ton, may be kept in vibration at 1000 strokes per minute through a distance of ⅜" by a power consumption of only ⅓ horsepower.

Figure 5:
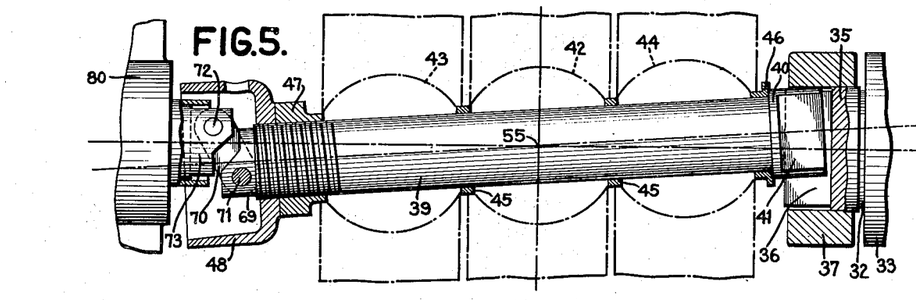
Fig. 5 is a view similar to Figure 4 showing certain of the parts in a different relation.
Figure 6:
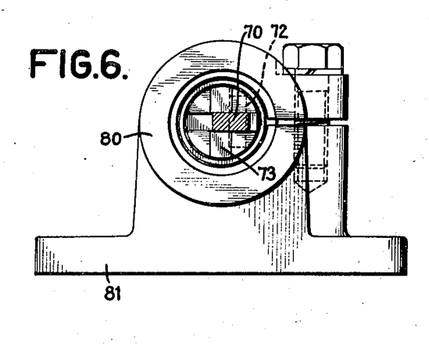
Fig. 6 is a sectional view along the line 6—6 of Figure 4 showing a detail.
Figure 7:
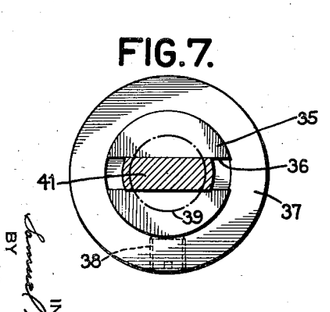
Fig. 7 is a detail in section along the line 7—7 of Figure 4.
Figure 8:
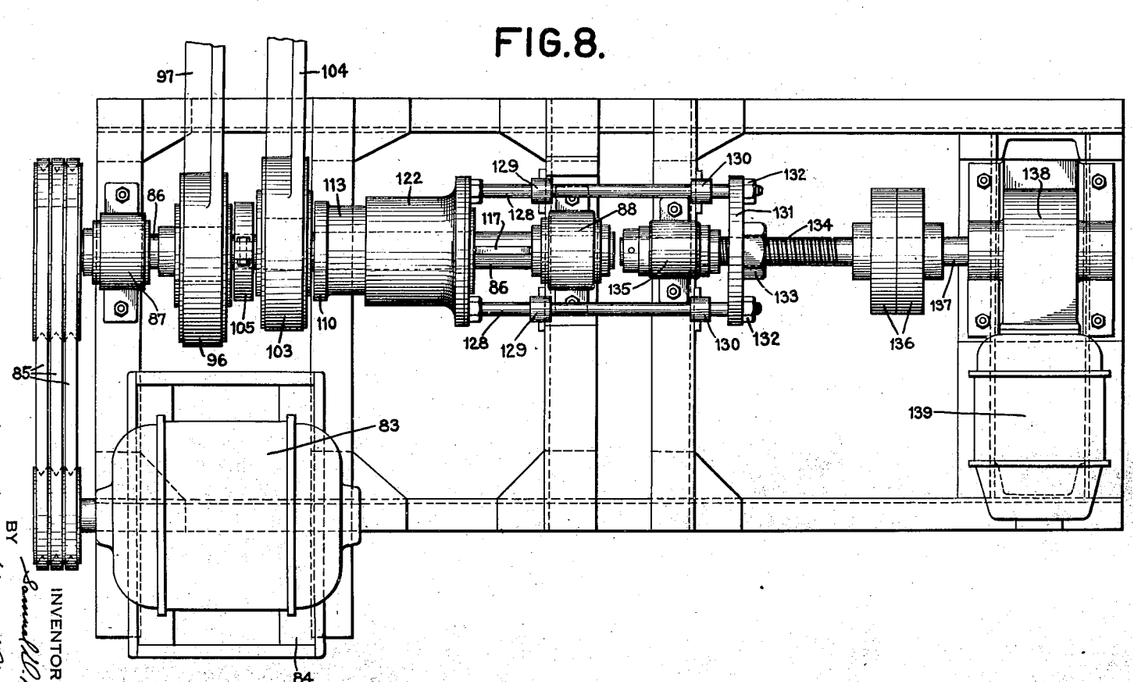
Fig. 8 is a plan view of the power means and drive of a modified construction.

It is another matter, however, to bring such a system into oscillation at or about the natural period through a stroke of desired magnitude. If the eccentric device of Fig. 4 were so adjusted as to provide the maximum throw of the screens, as indicated in Fig. 5, it would be impossible to set the screens into operation unless a motor were provided of sufficient capacity to overcome the resistance of the spring bars 14 when fully deflected. This would probably require a motor of 20 horsepower or more for a screen of the type mentioned.

Now, in accordance with the present invention, this difficulty is overcome by the provision of an eccentric device whose eccentricity or throw may be readily varied in the course of operation of the equipment. This enables the starting of the motor while the shaft 39 is in the position indicated in Fig. 4, at which time the load is simply the friction of the various rotating parts. After the motor has attained a speed sufficient to rotate the shaft 32 at the desired rate, say 1000 R. P. M., the lever 82 may be gradually operated to shift the sleeve 77 and bring about the tilting of the shaft 39 in the manner explained. It has been found that a comparatively small motor, i. e., one of a fractional horsepower, is readily capable of setting large screens of the character specified into operation under these conditions. Initially, the screens will partake of only a very slight movement but at or near their natural period and this movement is very readily increased in magnitude to the desired maximum at the same period of vibration. In actual practice it has been found possible to increase the stroke of the screens from zero to the desired maximum, say, ⅜ of an inch within only a few seconds after the motor has attained the desired speed.

One important feature of the improved construction is that a positive connection is provided at all times between the eccentric devices and the screens. Accordingly, the throw of the screens is at all times constant so long as the adjustment of the eccentric devices remains the same. It has been found that a comparatively small motor is capable of properly handling the variations in the load imposed on it by virtue of variations in the charge supplied to the screens.

In stopping the screens care should be exercised to first shift the lever 82 back to its normal position of Fig. 4 before the power is cut off. This is to avoid the transmission of excessive forces to and through the connecting links 63, which might result from the sudden stopping of the motor while the screen is undergoing its maximum vibrations.

While a manually operable lever has been shown for controlling the eccentric means this might be replaced by suitable power-operated devices. Such power-operated devices are illustrated in connection with a second embodiment of the invention which will be presently described.

Turning now to Figs. 8 to 11, inclusive, there is illustrated a modified arrangement for producing the desired oscillatory movements of the screens or other bodies. The source of power may be a motor 83 mounted on an adjustable slide 84 by the movements of which a variation in speed of the driven parts may be effected. The motor shaft for this purpose is provided with a pulley connected by suitable belts 85 with a pulley attached to the main prime-mover shaft 86. This shaft is carried by suitable bearings 87 and 88 mounted on the supporting frame. Intermediate the ends of the shaft 86 a pair of eccentrics 89 and 90 is formed. These eccentrics are disposed at an angle of 180 degrees with relation to each other.

Figures 9, 10, 11:
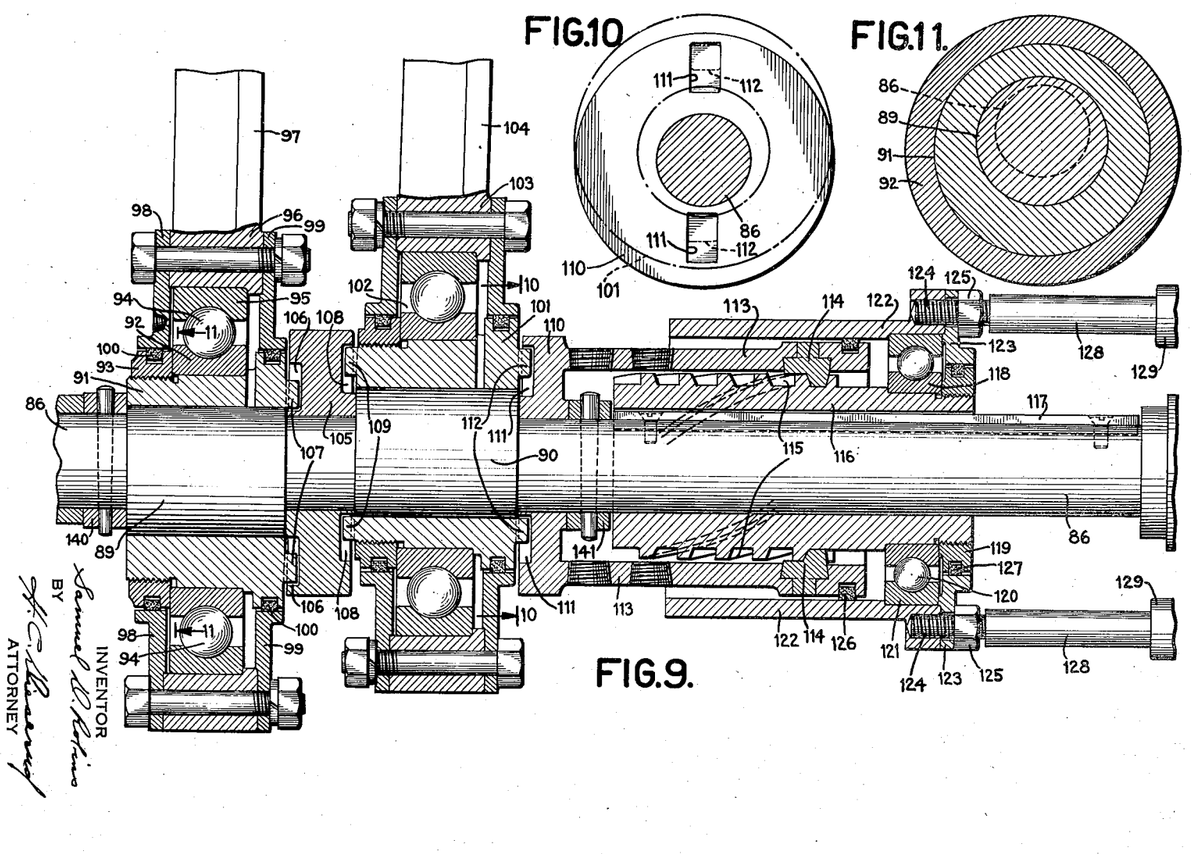
Fig. 9 is an enlarged, axial section through a portion of the construction of Figure 8.
Fig. 10 is a sectional view along the line 10—10 of Figure 9.
Fig. 11 is a sectional view along the line 11—11 of Figure 9.

Around the eccentric 89 is mounted an eccentric sleeve 91. The arrangement is such that in one position of the sleeve 91 its eccentricity will offset that of the main eccentric 89 so that the outer circumference of sleeve 91 will be concentric with the shaft 86. However, when the sleeve is turned through an angle of 180 degrees from said one position with respect to the eccentric 89, the two eccentricities will be combined. Around the central portion of the sleeve 91 is a bearing element 92 having a ball raceway in its outer face. A ring 93 having screw-threaded engagement with the sleeve 91 serves to hold the bearing element in its proper position. Balls 94 are provided around the element 92 and are in turn surrounded by another bearing element 95 having an interior raceway. This element is carried by a strap 96 having an extension 97 arranged to be connected with one of the vibratory screens in a manner similar to the rods 63. At the sides of the strap 96 there is a pair of plates 98 and 99 secured to the strap in any convenient way, as by means of the bolts indicated. In this way a housing for the ball bearing unit is provided. The inner circumferential faces of the plates 98 and 99 cooperate with suitable packing rings 100 carried by the ring 93 and the sleeve 91, respectively. This enables a suitable lubricant to be retained around the ball bearing unit.

The eccentric 90 has associated with it a similar construction, including a sleeve 101, a ball bearing unit 102 and a strap 103 having an extension 104 adapted to be connected with the other of a pair of screens. Between the two eccentrics is mounted a ring 105, formed in two sections bolted together (see Fig. 8) for purposes of assembly. In the left face of this ring, as viewed in Fig. 9, there is formed a pair of elongated, radial depressions or slots 106 adapted to receive projections 107 formed at the end of the sleeve 91. These slots and projections are provided at diametrically opposite points. Similar slots 108 are provided in the opposite face of the ring 105 and receive projections 109 at the end of the sleeve 101. An annular member 110 is provided at the opposite end of the eccentric 90, this member having elongated, radial slots 111 in its face arranged to receive projections 112 at the right end of sleeve 101. Member 110 carries an integral, cylindrical extension 113 which is provided adjacent its outer end with one or more inward projections 114 arranged to cooperate with a spiral, toothed formation 115 formed on the outer surface of a sleeve 116. In lieu of the series of helical teeth, shown on the outer surface of the sleeve 116, there may be provided if desired, only a single cam rib formation or a cam groove or slot.

The sleeve 116 is slidably mounted on the shaft 86 but is keyed thereto by means of a member 117 secured in any suitable way to the shaft. A ball bearing unit is mounted adjacent the end of the sleeve 116, this unit including an inner ring 118 clamped against a shoulder on the sleeve by means of a ring 119. The outer surface of the ring provides a raceway for the balls 120, which are in turn surrounded by a ring 121 providing the outer raceway. Ring 121 is clamped between a shoulder on a sleeve 122 and an end-plate 123 secured to the outer end of the sleeve by means of bolts 124. Nuts 125 on the bolts serve to clamp the parts in assembled relation. A packing ring 126 between the sleeves 113 and 122 and a similar packing 127 between the ring 119 and plate 123 serve to seal a reservoir for a suitable lubricant provided for the ball bearing unit and other relatively movable portions of the construction.

The bolts 124 are provided with enlarged extensions 128 carried by suitable bearings 129 and 130 mounted on the supporting frame. The free ends of the bolts beyond the bearings 130 are passed through a plate 131 which is clamped against shoulders on the bolts by means of nuts 132. At the center of the plate 131 there is secured in any suitable way a large nut 133 cooperating with the threads on a shaft 134. One end of this shaft is carried by a bearing 135 secured to the main frame while the opposite end is connected by a coupling 136 with a shaft 137 extending from a speed-reducing mechanism 138 driven by a motor 139.

Returning to Fig. 9, a pair of collars 140 and 141 is preferably provided on the shaft 86 at opposite sides of the double eccentric unit for retaining the various parts in assembled relation. These collars may be secured to the shaft in any convenient way, as by means of the pins indicated.

The operation of the modified construction is as follows:

The eccentrics as shown in Fig. 9 are arranged to provide a maximum throw. When it is desired to reduce this throw, the motor 139 is operated under control of any suitable form of switch to turn the shaft 134 at a speed determined by the speed reducer 138. The shaft is turned in the proper direction to cause the plate 131 to be drawn toward the right in Fig. 8, thereby pulling all of the bolts 128 toward the right and drawing the sleeve 116 in the same direction through the action of the ball bearing unit 118, 120 and 121. In drawing the sleeve 116 toward the right, its toothed formation 115 acting upon the projections 114 will rotate the sleeve 113 relative to the shaft 86. This may be accomplished even though the shaft 86 is being rotated at a suitable speed by the motor 83.

Turning of the sleeve 113 and its connected disc 110 relative to shaft 86 will cause a similar adjustment of sleeve 111 relative to eccentric 90. This, as explained before, will tend to reduce the combined eccentricity of the sleeve and eccentric. In the course of this relative movement of the sleeve and eccentric, the projections 112 on the sleeve will shift radially within the slots 111. Similarly the projections 109 at the opposite end of the sleeve will shift radially within slots 108 and will at the same time rotate the ring 105 relative to shaft 86. This ring in turn will shift the sleeve 91 relative to eccentric 89 through the coaction of slots 106 and projections 107. If the motor 139 is continued in operation until the sleeve 116 is drawn to the limit of its movement toward the right, the sleeves 91 and 101 will have been shifted through 180 degrees relative to the eccentrics 89 and 90, thereby completely offsetting the effect of these eccentrics. This means that the vibration of the screens will be reduced from their maximum extents to zero. When this is accomplished the power may be shut off from the motor 83 and the entire mechanism brought to rest. When it is desired to operate the screens again, the motor 83 is first started and brought to the desired speed so that shaft 86 will be revolved at, say, 1000 R. P. M. Motor 139 is then set into operation to shift the sleeve 116 again toward the left, thereby rotating the sleeves 91 and 101 through a desired angle relative to the eccentrics 89 and 90. The speed reduction from the motor 139 may be such that this shifting of the sleeves will require a few seconds.

Any suitable means may be employed for controlling the motor 139. A simple manual switch may be employed if desired or, if preferred, some automatic means may be employed to arrest the operation of the motor when the sleeve 116 reaches either of its extreme positions or any desired intermediate position.

In whatever form of the invention may be adapted it is not necessary that the eccentricity of the eccentric means be reduced precisely to zero since a comparatively small motor will be capable of setting the screens into oscillation through a small stroke. Thus in dealing with a one-ton screen of the type mentioned a ⅓ horsepower motor would be capable of starting the screens into operation through a stroke of 3/32 of an inch or even more. It is not actually necessary to reduce the stroke of the eccentric means below that at which the motor is able to set the system into vibration.

While several embodiments of the invention have been described in considerable detail as applied to vibratory screens it will be understood that numerous variations may be made in the character, construction and arrangement of the component parts and in the general assembly without departing from the principles and scope of the invention. Furthermore, the invention is applicable to a variety of other types of oscillatory or vibratory bodies presenting similar problems. The terms and expressions used herein are to be regarded as terms of description and not of limitation.

What I claim is:

1. In apparatus of the class described a body mounted for oscillation, resilient means tending to restore said body to a normal central position, said body and means being constructed and arranged to provide a natural period substantially equal to the desired speed of oscillation of the body, power means constructed and arranged to oscillate the body at the desired speed of oscillation, substantially rigid connections from said power means to said body for setting the same into oscillation, and means for varying the magnitude of said oscillations while the parts are in motion and while said connections remain positive.

2. In apparatus of the class described a body mounted for oscillation, resilient means tending to restore said body to a normal central position, said body and means being constructed and arranged to provide a natural period substantially equally to the desired speed of oscillation of the body, power driven eccentric means constructed and arranged to oscillate the body at the desired speed of oscillation, positive connections from said eccentric means to said body for setting the same into oscillation, and means for varying the eccentricity of said eccentric means at it is being driven.

3. In appparatus of the class described a body mounted for oscillation, resilient means tending to restore said body to a normal central position, said body and means being constructed and arranged to provide a natural period substantially equal to the desired speed of oscillation of the body, a power driven shaft, positive connections from said shaft to said body for setting the same into oscillation at the desired speed, and means for varying the magnitude of the oscillations while said shaft is in operation and while said positive connections are maintained.

4. In apparatus of the class described a body mounted for oscillation, resilient means tending to restore said body to a normal central position, said body and means being constructed and arranged to provide a natural period approximately equal to the desired speed of oscillation of the body, power means constructed and arranged to oscillate the body at the desired speed of oscillation, positive connections between said power means and said body, and means in said connections for positively varying the magnitude of oscillation of said body while the parts are in motion.

5. In apparatus of the class described a body mounted for oscillation, resilient means tending to restore said body to a normal central position, said body and means being constructed and arranged to provide a natural period approximately equal to the desired speed of oscillation of the body, power means constructed and arranged to oscillate the body at the desired speed of oscillation, said power means being capable of maintaining said body in oscillation through a desired distance but being incapable of overcoming said resilient means to shift said body through said distance when the parts are at rest, positive connections between said power means and said body, and means in said connections for positively varying the magnitude of oscillation of said body while the parts are in motion.

6. In apparatus of the class described a frame, an oscillatory body, a plurality of arms pivotally attached to said frame and to said body, resilient means urging said body into a normal, central position, said body and means being constructed and arranged to provide a natural period approximately equal to the desired speed of oscillation of the body, a prime mover, and positive connections from said prime mover to said body for oscillating the same at the desired speed, said connections including means for varying the amplitude of oscillation of said body at will while it is in motion.

7. In apparatus of the class described a frame, an oscillatory screen, a plurality of arms pivotally attached to said frame and to said screen, resilient means urging said screen into a normal, central position in which a line joining the axes of the pivots of each arm is inclined at an angle to the vertical, said screen and means being constructed and arranged to provide a natural period substantially equal to the desired speed of oscillation of the screen, a prime mover, and positive connections from said prime mover to said screen for oscillating the same at the desired speed, said connections including means for varying the amplitude of oscillation of said screen at will while it is in motion.

8. In apparatus of the class described a frame, an oscillatory body, a plurality of arms pivotally connected with said body, torsion bars carried by said frame, each of said arms being connected with one of said bars, said bars urging said body into a normal central position, a prime mover, and positive connections from said prime mover to said body for oscillating the same, said connections including means for varying the extent of oscillation of said body at will while it is in motion.

9. In apparatus of the class described a frame, an oscillatory body, a plurality of arms pivotally connected with said body, torsion bars carried by said frame, each of said arms being connected with one of said bars, said bars urging said body into a normal central position, a prime mover, said power means being incapable of shifting said body against the action of said torsion bars through the desired stroke directly from a condition of rest, and positive connections from said prime mover to said body for oscillating the same, said connections including means for varying the extent of oscillation of said body at will while it is in motion.

10. In apparatus of the class described a frame, an oscillatory body, a plurality of arms pivotally connected with said body, torsion bars carried by said frame, each of said arms being connected with one of said bars, said bars urging said body into a normal central position, a prime mover, and positive connections from said prime mover to said body for oscillating the same at a rate approximating the natural period of vibration of said body under the action of said torsion bars, said connections including means for varying the extent of oscillation of said body at will while it is in motion.

11. In apparatus of the class described a frame, an oscillatory body extending longitudinally of the frame, a plurality of torsion bars extending transversely of the frame and carried thereby, a plurality of arms attached to said bars one adjacent each end thereof and adapted to impart a torque to said bars, said arms being pivotally connected with said body, means for anchoring the mid-portions of said bars to prevent twisting thereof, and means for imparting an oscillatory movement to said body.

12. In apparatus of the class described a frame, an oscillatory body extending longitudinally of the frame, a plurality of torsion bars extending transversely of the frame and carried thereby, a plurality of arms attached to said bars one adjacent each end thereof and adapted to impart a torque to said bars, said arms being pivotally connected with said body, means for anchoring the mid-portions of said bars to prevent twisting thereof, a prime mover, connections therefrom for imparting an oscillatory movement to said body, and means for determining the extent of said oscillatory movement at will during the operation of said prime mover.

13. In apparatus of the class described a frame, a pair of super-posed vibratory screens extending longitudinally of said frame, two series of torsion bars carried by said frame and extending transversely thereof, a plurality of arms pivotally attached to each of said screens, the arms connected with one screen being firmly secured to the bars of one series adjacent their ends and the arms connected with the other screen being similarly secured to the bars of the other series, means connecting the mid-portions of the bars of one series with the mid portions of the bars of the other series to anchor said mid-portions against rotation, and means for imparting oscillatory movements to said screens in opposed relation.

14. In apparatus of the class described a frame, a pair of vibratory screens mounted in said frame, resilient means tending to restore said screens to their normal central positions, said screens and means being constructed and arranged to provide a natural period substantially equal to the desired speed of oscillation of the screens, a prime mover, substantially rigid connections from said prime mover for imparting opposed oscillatory movements to said screens at the desired speed, and means for simultaneously varying at will the extent of said movements while said prime mover is in operation.

15. A method of imparting a state of vibration to a resiliently positioned vibratory load-carrying surface and maintaining such load-carrying surface in vibration which comprises first imparting to said load carrying surface vibrations of relatively slight extent and of a frequency approximating the natural period of vibration of said load-carrying surface, then gradually increasing the magnitude of said vibrations at a positively controlled rate until the desired extent is reached, and maintaining said vibrations at the desired frequency and magnitude.

16. A method of imparting a state of vibration to a resiliently positioned vibratory screen and maintaining such a screen in vibration which comprises first imparting to said screen vibrations of relatively slight extent and of a frequency approximating the natural period of vibration of said screen, then gradually increasing the magnitude of said vibrations at a positively controlled rate until the desired extent is reached, and maintaining said vibrations at the desired frequency and magnitude.

SAMUEL D. ROBINS.